United States Patent
Shu et al.

(10) Patent No.: US 9,420,415 B2
(45) Date of Patent: Aug. 16, 2016

(54) WIRELESS COMMUNICATION METHOD, NODE, AND MONITORING NODE

(71) Applicant: FUJITSU LIMITED, Kawasaki-shi, Kanagawa (JP)

(72) Inventors: Ki Shu, Fukuoka (JP); Ryoko Tamura, Kitakyusyu (JP); Akihisa Erami, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 180 days.

(21) Appl. No.: 14/498,233

(22) Filed: Sep. 26, 2014

(65) Prior Publication Data
US 2015/0009856 A1  Jan. 8, 2015

Related U.S. Application Data

(63) Continuation of application No. PCT/JP2012/058753, filed on Mar. 30, 2012.

(51) Int. Cl.
*H04W 4/02* (2009.01)
*H04W 8/00* (2009.01)
*H04W 84/18* (2009.01)

(52) U.S. Cl.
CPC .......... *H04W 4/02* (2013.01); *H04W 8/005* (2013.01); *H04W 4/023* (2013.01); *H04W 84/18* (2013.01)

(58) Field of Classification Search
None
See application file for complete search history.

(56) References Cited

U.S. PATENT DOCUMENTS

| 8,139,516 | B2 * | 3/2012 | Isozu | H04W 8/005 370/312 |
| 2004/0082341 | A1 | 4/2004 | Stanforth | |
| 2008/0201164 | A1 | 8/2008 | Suzuki | |
| 2009/0154398 | A1 * | 6/2009 | Isozu | H04W 84/18 370/328 |
| 2011/0170443 | A1 * | 7/2011 | Murias | H04W 40/28 370/252 |
| 2011/0235504 | A1 | 9/2011 | Nozaki et al. | |

FOREIGN PATENT DOCUMENTS

| JP | 2005-526444 A | 9/2005 |
| JP | 2007-042009 A | 2/2007 |
| JP | 2007-274068 A | 10/2007 |
| JP | 2008-205677 A | 9/2008 |
| JP | 2011-048493 A | 3/2011 |
| JP | 2011-205556 A | 10/2011 |

OTHER PUBLICATIONS

International Search Report, mailed in connection with PCT/JP2012/058753 and mailed Jul. 3, 2012 (Total number of pp. 9).

* cited by examiner

*Primary Examiner* — Hong Cho
(74) *Attorney, Agent, or Firm* — Fujitsu Patent Center

(57) ABSTRACT

A first node selects a selection node that is the send source of a packet with the highest received radio wave intensity from among packets received from a plurality of second node. The first node sends, to the selection node, a report packet that stores therein an identifier that specifies each of a plurality of first nodes and whose destination is a third node. The second node adds an identifier that specifies each of the plurality of second nodes to the report packet that was received from the first node with the received radio wave intensity that is equal to or greater than a predetermined value among the report packets which are transmitted by the plurality of first nodes and relays the report packet to the third node. The third node detects a node corresponding to the identifier that is not included in the report packets received.

5 Claims, 12 Drawing Sheets

| LS | RSSI VALUE | HELLO RECEPTION COUNT | HELLO REQUEST INTERVAL | ACCESS KEY |
|---|---|---|---|---|
| NODE A | 80 | 5 | 1 | AAA |
| NODE B | 40 | 5 | 1 | CCC |

| GD | LD | HOP COUNT | QUALITY |
|---|---|---|---|
| MONITORING NODE | NODE A | 2 | 20 |
| | NODE B | 3 | 15 |

FIG.6

| LS | RSSI VALUE | HELLO RECEPTION COUNT | HELLO REQUEST INTERVAL | ACCESS KEY |
|---|---|---|---|---|
| NODE A | 80 | 5 | 1 | AAA |

FIG.7

| GD | LD | HOP COUNT | QUALITY |
|---|---|---|---|
| NODE A | NODE A | 1 | 70 |
| NODE B | NODE A | 2 | 50 |
| NODE C | NODE A | 2 | 30 |

WIRELESS COMMUNICATION METHOD, NODE, AND MONITORING NODE

CROSS-REFERENCE TO RELATED APPLICATION

This application is a continuation of International Application No. PCT/JP2012/058753, filed on Mar. 30, 2012 and designating the U.S., the entire contents of which are incorporated herein by reference.

FIELD

The embodiments discussed herein are directed to a wireless communication method, a node, and a monitoring node.

BACKGROUND

In recent years, wireless ad hoc networks in which terminals are directly connected without using network infrastructure, such as access points, are used. Nodes constituting a wireless ad hoc network autonomously construct paths by exchanging message referred to as, for example, HELLO packets with neighboring nodes. Accordingly, each of the nodes can deliver data to a target destination node via another node by autonomously detouring a node in which a failure has occurred.

There is a known method, as a method of managing each of the nodes that constituting a wireless ad hoc network, of calculating the relative distance from a fixed node that participates in a network and managing the location of each of the nodes. Furthermore, there is a known method of providing each node with a global positioning system (GPS) and managing the location of the node by using the GPS.

Patent Document 1: Japanese National Publication of International Patent Application No. 2005-526444
Patent Document 2: Japanese Laid-open Patent Publication No. 2011-048493

However, in a system in which a path change is frequently occurs due to the moving of each node, even if the conventional technology is used, there is a problem in that it is not possible to specify the location of a node that is separated from a wireless ad hoc network.

For example, in the method of calculating the relative distance, because the location of a node is specified at the relative distance from a fixed node, it is difficult to specify the location of each node in a system in which no fixed node is present. Furthermore, in a system in which a node may sometimes be moved inside a building or moved to a basement, even if the GPS is used, it is not possible to accurately measure the location of the node. Consequently, in the method that uses the GPS, it is difficult to specify the location in which a node is separated.

SUMMARY

According to an aspect of the embodiment, a wireless communication method is used in a wireless system including a plurality of first nodes, a plurality of second nodes and a third node which execute a wireless communication using a wireless ad hoc network. the wireless communication method includes selecting a selection node that is a send source of a packet with the highest received radio wave intensity from among packets which are transmitted by the plurality of second nodes, by the plurality of first nodes; sending, to the selection node, a report packet that includes an identifier that specifies each of the plurality of first nodes and whose destination is the third node, by the plurality of first nodes; adding an identifier that specifies each of the plurality of second nodes to the report packet which is received with the received radio wave intensity that is equal to or greater than a predetermined value among the report packets which are transmitted by the plurality of first nodes and relaying the report packet to the third node, by the plurality of second nodes; and detecting a node corresponding to the identifier that is not included in the report packets received from the plurality of second nodes, by the third node.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a schematic diagram illustrating an example of information stored in a link table of a monitoring node;

FIG. 7 is a schematic diagram illustrating an example of information stored in a path table of monitoring nodes;

DESCRIPTION OF EMBODIMENTS

Preferred embodiments of the present invention will be explained with reference to accompanying drawings. The present invention is not limited to these embodiments.

[a] First Embodiment

Figure 1:
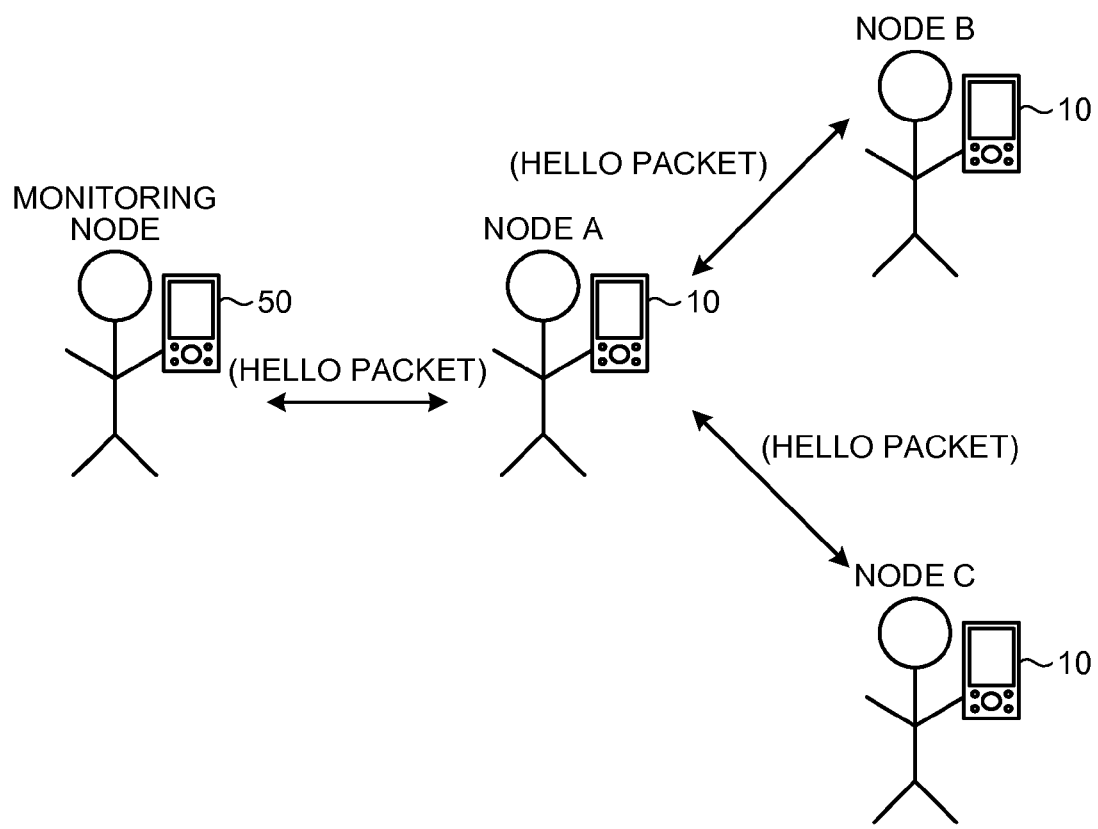
FIG. 1 is a schematic diagram illustrating an example of the overall configuration of a wireless ad hoc network according to a first embodiment.

Overall Configuration
FIG. 1 is a schematic diagram illustrating an example of the overall configuration of a wireless ad hoc network according to a first embodiment. As illustrated in FIG. 1, the system in the wireless ad hoc network is constituted by multiple nodes 10 and a monitoring node 50. The number of nodes illustrated in FIG. 1 is only an example and is not limited thereto.

In this example, It is assumed that a children observation system that monitors a group behavior of children and that detects a child who is likely to separate from the group. Specifically, a leader, such as a parent, corresponds to a monitoring node and each of the children corresponds to each node. In other words, the system illustrated in FIG. 1 is a system in which a path change is frequently occurs due to the moving of each of the nodes.

Furthermore, each of the nodes illustrated in FIG. 1 sends and receives a regular message called, for example, a HELLO packet to and from a neighboring node and then creates path information. Specifically, the monitoring node 50 exchanges, with a node A, a HELLO packet that includes path information that is stored with each other. The node A exchanges, with the monitoring node 50, a node B, and a node C, a HELLO packet that includes therein path information that is stored with each other. The node B exchanges, with the node A, a HELLO packet that includes path information that is stored with each other. The node C exchanges, with the node A, a HELLO packet that includes therein path information that is stored with each other.

In this system, the node A is located in a single hop from the monitoring node 50 and directly sends data to the monitoring node 50. The node B is located in two hops from the monitoring node 50 and sends data to the monitoring node 50 via the node A. Similarly, the node C is located in two hops from the monitoring node 50 and sends data to the monitoring node 50 via the node A. Specifically, the node A is a relay node and the node B and the node C are end nodes.

In this state, the node B or the node C selects, from among the packets received from neighboring nodes, the node A as the send source of the packet with the highest received radio wave intensity. Then, the node B or the node C sends, to the selected node A, a report packet in which an identifier that specifies its own node is included and the monitoring node 50 is indicated as the destination. The node A adds the identifier of its own node to the report packet that has a received radio wave intensity that is equal to or greater than a predetermined value and that is received from the node B or the node C and then relays the report packet to the monitoring node 50. The monitoring node detects a node that is not included in the report packet received from the node A.

Specifically, while each of the nodes 10 adds information on its own node to a report packet, each of the nodes 10 selects a node with a large received signal strength indicator (RSSI) value and then relays the report packet to the monitoring node 50. Furthermore, even if each of the nodes 10 receives a report packet, each of the nodes 10 discards a report packet with an RSSI value that is smaller than the predetermined value. Then, the monitoring node 50 detects a node that disappeared from the report packet. Consequently, even if no fixed node or no GPS is specified, by using an ad hoc network function, it is possible to detect a node that is likely to separate from the network or detect the location of that node.

Configuration of a Node

Figures 2, 3:
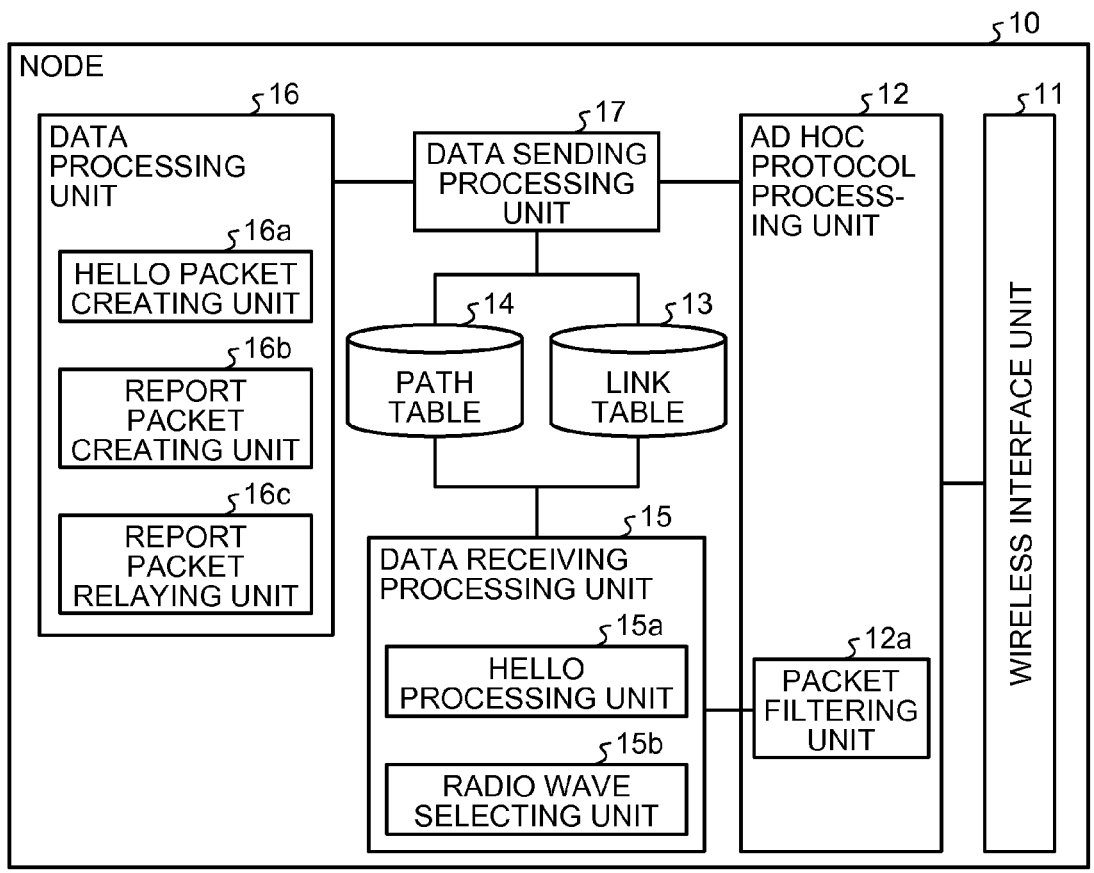
FIG. 2 is a functional block diagram illustrating the configuration of a node.
FIG. 3 is a schematic diagram illustrating an example of information stored in a link table of nodes.

FIG. 2 is a functional block diagram illustrating the configuration of a node. Because the node A, the node B, and the node C illustrated in FIG. 1 have the same configuration, descriptions thereof will be given as the node 10.

As illustrated in FIG. 2, the node 10 includes a wireless interface unit 11, an ad hoc protocol processing unit 12, a link table 13, a path table 14, a data receiving processing unit 15, a data processing unit 16, and a data sending processing unit 17.

The wireless interface unit 11 is a wireless communication interface that performs wireless communication with another node. For example, the wireless interface unit 11 receives, from a neighboring node, a HELLO packet, a report packet, or the like, and then outputs the packet to the ad hoc protocol processing unit 12. Furthermore, the wireless interface unit 11 broadcasts a HELLO packet received from the ad hoc protocol processing unit 12 to neighboring nodes or sends, to the destination node, the report packet received from the ad hoc protocol processing unit 12.

The ad hoc protocol processing unit 12 adds an ad hoc header to each packet sent from the data sending processing unit 17, sends the each packet to the destination, and outputs the packet received by the wireless interface unit 11 to the data receiving processing unit 15. For example, if a HELLO packet is input from the data sending processing unit 17, the ad hoc protocol processing unit 12 adds an ad hoc header to the HELLO packet and then broadcasts the packet to the neighboring nodes. Furthermore, if a report packet is input from the data sending processing unit 17, the ad hoc protocol processing unit 12 adds an ad hoc header to the report packet and sends the report packet to the destination node.

The ad hoc protocol processing unit 12 includes a packet filtering unit 12a. The packet filtering unit 12a is a processing unit that performs filtering of a packet by using the received radio wave intensity. Specifically, if the packet filtering unit 12a receives a HELLO packet or a report packet, the packet filtering unit 12a measures an RSSI value obtained the packet is received. Then, the packet filtering unit 12a outputs, to the data receiving processing unit 15, a packet in which the received RSSI value is greater than a predetermined threshold. Furthermore, for the packet in which the RSSI value obtained at the reception of the packet is smaller than the predetermined threshold, the packet filtering unit 12a may discard the packet or may output the packet to the data receiving processing unit 15 together with a notification indicating that the packet is out of the processing target.

The link table 13 is a storing unit that stores therein information on neighboring nodes. The information stored in the link table 13 is information that is extracted by the data receiving processing unit 15 from a HELLO packet. Accordingly, the link table 13 is updated every time a HELLO packet is received. Furthermore, it is assumed that the link table 13 according to the first embodiment is created on the basis of a HELLO packet that is received with an RSSI value that is equal to or greater than a predetermined value. Accordingly, if no HELLO packet that is received with an RSSI value that is equal to or greater than a predetermined value is present, there may be a case in which the link table 13 is empty.

FIG. 3 is a schematic diagram illustrating an example of information stored in a link table of nodes. As illustrated in FIG. 3, the link table 13 stores therein, for example, the "local send source address (LS), the RSSI value, the HELLO reception count, the HELLO request interval, and the access key". The information illustrated in FIG. 3 is only an example; therefore, the information may also arbitrarily be changed by adding, for example, quality information indicating the quality between links.

The "local send source address (LS)" is address information on the send source node of the received HELLO packet. The "RSSI value" is the received radio wave intensity at the time when a HELLO packet is received. The "HELLO reception count" indicates the number of times the HELLO packets received from the local send source (LS). The "HELLO request interval" indicates the interval of sending and receiving a packet with the LS. The "access key" indicates an encryption key that is used when the frame type sent from a send source node decodes an encryption of a data frame that is other than the HELLO packet.

In the example illustrated in FIG. 3, the node 10 corresponds to the node C illustrated in FIG. 1. In FIG. 3, the symbol of AAA is specified as an access key to the node A. Furthermore, the interval at which a HELLO packet is received from the node A is one second and a HELLO packet is received five times before now. Furthermore, FIG. 3 indicates that the latest HELLO packet was received with the RSSI value of 80.

Figures 4, 5:
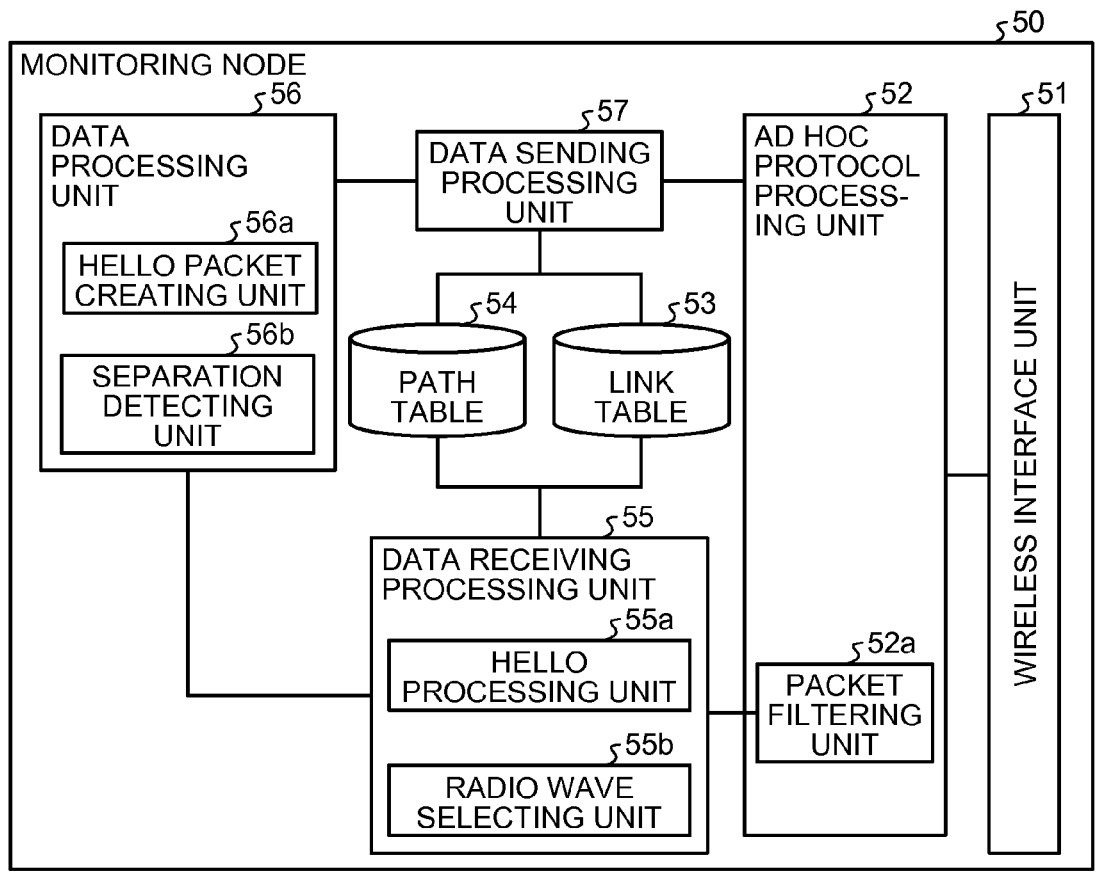
FIG. 4 is a schematic diagram illustrating an example of information stored in a path table of nodes.
FIG. 5 is a functional block diagram illustrating the configuration of a monitoring node.

The path table 14 stores therein routing information on a path to the destination node. Specifically, from among multiple paths to the destination node, the path table 14 stores therein a predetermined number of paths as appropriate paths in the order of, for example, good quality. Because the path table 14 is created on the basis of the link table 13, if the link table 13 is empty, there may be a case in which the path table 14 is also empty. FIG. 4 is a schematic diagram illustrating an example of information stored in a path table of nodes. As illustrated in FIG. 4, the path table 14 stores therein, in an associated manner, the "global destination (GD), the local destination (LD), the hop count, and the quality".

The "GD" stored in the path table 14 indicates a global destination address and is address information on the last destination node. The "LD" is address information on a relay destination node that is the subsequent destination and that is used to deliver a packet to a GD. The "hop count" indicates a hop count to a GD. The "quality" indicates the quality of a path to a GD and is obtained by converting, for example, an amount of delay, the radio wave intensity, the packet loss rate, or the like into numbers. In this example, the quality is higher as a value is greater.

The example illustrated in FIG. 4 indicates a case in which the node 10 is the node C illustrated in FIG. 1. FIG. 4 indicates that the node C has two paths that are used to send a packet to the monitoring node 50. A first path is a two-hop path that goes through the node A and a second path is a three-hop path that goes through the node B. Between these two paths, the node C selects the path that goes through the node A, whose quality is better than the node B, and sends the packet to the monitoring node.

A description will be given here by referring back to FIG. 2. The data receiving processing unit 15 is a processing unit that includes a HELLO processing unit 15a and a radio wave selecting unit 15b and that performs a receiving process on data that is input from the ad hoc protocol processing unit 12.

The HELLO processing unit 15a is a processing unit that updates the path table 14 and the link table 13 on the basis of the HELLO packet received with an RSSI value that is equal to or greater than the predetermined value. For example, the HELLO processing unit 15a receives, from the packet filtering unit 12a, a HELLO packet and an RSSI value at the time when the HELLO packet is received. Then, the HELLO processing unit 15a extracts, from the HELLO packet, the LS, the quality, the hop count to the monitoring node, and the like. Subsequently, the HELLO processing unit 15a updates the "RSSI value" that is associated with the extracted LS and that is stored in the link table 13 to the value at the time when the HELLO packet is received this time and then increments the "HELLO reception count". If the extracted LS is not stored in the link table 13, the HELLO processing unit 15a creates a new record.

Furthermore, the HELLO processing unit 15a updates the path table 14 on the basis of the link table 13. For example, the HELLO processing unit 15a creates, in the path table 14, a table in which the LS stored in the link table 13 is set to the LD and the GD is set to the monitoring node 50. Then, the HELLO processing unit 15a increments the hop count extracted from the HELLO packet in which the LS is set to the send source and then stores the incremented value as a hop count in the associated table in the path table 14. At this point, if multiple hop counts are included in a HELLO packet, the HELLO processing unit 15a increments the smallest value. Furthermore, the HELLO processing unit 15a extracts the quality from a HELLO packet in which the LS is set to the send source and then the quality in the associated table in the path table 14.

The radio wave selecting unit 15b is a processing unit that controls such that a path with the highest RSSI value is selected. For example, the radio wave selecting unit 15b refers to the link table 13 and sorts the records in descending order of the RSSI values such that the record with the highest RSSI value from among the records is the top in the link table 13.

The data processing unit 16 is a processing unit that includes a HELLO packet creating unit 16a, a report packet creating unit 16b, and a report packet relaying unit 16c and that creates and relays various packets by using these units in the data processing unit 16.

The HELLO packet creating unit 16a is a processing unit that creates a HELLO packet at predetermined intervals. Specifically, the HELLO packet creating unit 16a creates a HELLO packet to which path information stored in the path table 14, a hop count to the monitoring node 50, and the like is added and then outputs the created HELLO packet to the data sending processing unit 17. For example, the HELLO packet creating unit 16a inserts the pieces of path information stored in the path table 14 into a HELLO header. Specifically, the HELLO packet creating unit 16a creates HELLO headers, the number of which is the same as that of records present in the path table 14. Then, the HELLO packet creating unit 16a creates HELLO packets each of which includes the created HELLO header.

The report packet creating unit 16b is a processing unit that creates a report packet that notifies the presence of its own node. Specifically, the report packet creating unit 16b creates a report packet by adding an identifier that indicates a report packet or an identifier that specifies its own node to a packet that has been sent and received in a typical ad hoc network. Then, the report packet creating unit 16b outputs the created report packet to the data sending processing unit 17. Any timing is available for the timing at which the report packet is created. Furthermore, the timing may also be synchronized with the nodes, or the timing may also be specified by the monitoring node 50.

The report packet relaying unit 16c is a processing unit that relays, to the monitoring node 50, a report packet that has been received with the RSSI value that is equal to or greater than the predetermined value. Specifically, from among the report packets sent from the other nodes, the report packet relaying unit 16c receives a report packet with the RSSI value that is equal to or greater than the predetermined value from the packet filtering unit 12a. Then, the report packet relaying unit 16c adds an identifier that is used to identify its own node to the received report packet and then outputs the report packet to the data sending processing unit 17.

For example, if the node 10 is the node A, the report packet relaying unit 16c adds an identifier of the node A to the report packet received from the node 8 at the position after the identifier of the node B that has already been added and then relays the packet to the monitoring node 50. Similarly, the report packet relaying unit 16c adds an identifier of the node A to the report packet received from the node C at the position after the identifier of the node C that has already been added and then relays the packet to the monitoring node 50.

The data sending processing unit 17 is a processing unit that performs a process of sending a HELLO packet or a report packet. For example, when a HELLO packet is input from the HELLO packet creating unit 16a, the data sending processing unit 17 specifies that the destination indicates broadcast addresses. Then, the data sending processing unit 17 outputs the HELLO packet and the destination to the ad hoc protocol processing unit 12.

Furthermore, when a report packet is input from the report packet creating unit 16b, the data sending processing unit 17 specifies that the destination (GD) is the monitoring node 50. Subsequently, the data sending processing unit 17 refers to the path table 14 and specifies that there are two paths toward the monitoring node and that the subsequent destination (LD) is the node A or the node B. Then, the data sending processing unit 17 refers to the link table 13 and selects, between the node A and the node B, the node A that has the higher RSSI value. Then, the data sending processing unit 17 outputs, to the ad hoc protocol processing unit 12, the report packet and an instruction indicating that transmission is performed by using the node A as the LD. If the data sending processing unit 17 receives an input of the report packet from the report packet relaying unit 16c, the data sending processing unit 17 performs the same process as that described above.

Furthermore, when the ad hoc protocol processing unit 12 sends each packet, the ad hoc protocol processing unit 12 rewrites the Local Source (LS) stored in each packet to its own node. As described above, when the data sending processing unit 17 sends a HELLO packet or a report packet, the data sending processing unit 17 refers to the link table 13 or the path table 14 and specifies a destination address or the like. Consequently, if no entry is present in a table, the data sending processing unit 17 is not able to send a packet.

Configuration of the Monitoring Node

FIG. 5 is a functional block diagram illustrating the configuration of a monitoring node. As illustrated in FIG. 5, the monitoring node 50 includes a wireless interface unit 51, an ad hoc protocol processing unit 52, a link table 53, a path table 54, a data receiving processing unit 55, a data processing unit 56, and a data sending processing unit 57.

The wireless interface unit 51 is a wireless communication interface that performs wireless communication with the other nodes. For example, the wireless interface unit 51 receives a HELLO packet, a report packet, or the like from a neighboring node and then outputs the packet to the ad hoc protocol processing unit 52. Furthermore, the wireless interface unit 51 broadcasts a HELLO packet received from the ad hoc protocol processing unit 52 to neighboring nodes or sends a report packet received from the ad hoc protocol processing unit 52 to a destination node.

The ad hoc protocol processing unit 52 adds an ad hoc header to each of the packets sent from the data sending processing unit 57, sends the packets to each destination, and outputs the packet received by the wireless interface unit 51 to the data receiving processing unit 55. The process performed by the ad hoc protocol processing unit 52 is the same as that performed by the ad hoc protocol processing unit 12; therefore, a description thereof in detail will be omitted. The ad hoc protocol processing unit 52 includes a packet filtering unit 52a; however, the process performed by the packet filtering unit 52a is the same as that performed by the packet filtering unit 12a; therefore, a description thereof in detail will be omitted.

The link table 53 is a storing unit that stores therein information on a neighboring node. The information stored in the link table 53 is information that is extracted by the data receiving processing unit 55 from a HELLO packet. Accordingly, the link table 53 is updated every time a HELLO packet is received. Furthermore, it is assumed that the link table 53 according to the first embodiment is created on the basis of a HELLO packet that has been received with an RSSI value that is equal to or greater than a predetermined value.

FIG. 6 is a schematic diagram illustrating an example of information stored in a link table of a monitoring node. As illustrated in FIG. 6, the link table 53 stores therein, for example, the "local send source address (LS), the RSSI value, the HELLO reception count, the HELLO request interval, and the access key". The pieces of information stored in the link table 53 are the same as those illustrated in FIG. 3; therefore, descriptions thereof in detail will be omitted.

In the example illustrated in FIG. 6, the symbol of AAA is specified as an access key to the node A. Furthermore, the interval at which a HELLO packet is received from the node A is one second and a HELLO packet is received five times before now. Furthermore, FIG. 6 indicates that the latest HELLO packet has been received with the RSSI value of 80.

The path table 54 stores therein routing information on a path to the destination node. Specifically, from among multiple paths to the destination node, the path table 54 stores therein, in the order of, for example, good quality, the predetermined number of paths as appropriate paths. FIG. 7 is a schematic diagram illustrating an example of information stored in a path table of monitoring nodes. As illustrated in FIG. 7, the path table 54 stores therein, in an associated manner, the "GD, the LD, the hop count, and the quality". The pieces of information stored in the path table 54 are the same as those illustrated in FIG. 4; therefore, descriptions thereof in detail will be omitted.

The example illustrated in FIG. 7 indicates that the monitoring node has paths to the node A, the node B, and the node C that are used as the destination. The path to the node A is a 1-hop path to the node A that corresponds to both the destination and the relay destination and has the quality of 70. The path to the node B is a 2-hop path to the node A that corresponds to the relay destination and has the quality of 50. The path to the node C is a 2-hop path to the node A that corresponds to the relay destination and has the quality of 30.

A description will be given here by referring back to data FIG. 5. The data receiving processing unit 55 is a processing unit that includes a HELLO processing unit 55a and a radio wave selecting unit 55b and that performs a receiving process on data that is input from the ad hoc protocol processing unit 52. Because the data receiving processing unit 55 performs the same process as that performed by the data receiving processing unit 15, the HELLO processing unit 55a performs the same process as that performed by the HELLO processing unit 15a, and the radio wave selecting unit 55b performs the same process as that performed by the radio wave selecting unit 15b described the above by referring to FIG. 2, descriptions thereof in detail will be omitted.

The data processing unit 56 is a processing unit that includes a HELLO packet creating unit 56a and a separation detecting unit 56b and that creates and relays various packets by using these units included in the data processing unit 56. If a power supply of each of the nodes is turned on and an ad hoc network is constructed, the data processing unit 56 notifies all of the nodes of the transmission timing of a report packet. The transmission timing can arbitrarily be set, such as an interval of three seconds. The HELLO packet creating unit 56a performs the same process as that performed by the HELLO packet creating unit 16a described above by referring to FIG. 2; therefore, a description thereof in detail will be omitted.

The separation detecting unit 56b is a processing unit that detects a node that has been separated from or that is likely to be separated from an ad hoc network. Specifically, the separation detecting unit 56b compares information on a node that is extracted from a report packet that was received in the past with information on a node that is extracted from a report packet that is received this time and then specifies a node that is not able to be extracted this time as a separation prediction node.

For example, it is assumed that the separation detecting unit 56b has received the report packet A, the report packet B, and the report packet C from the node A at the immediately previous timing. Then, the separation detecting unit 56b extracts the identifier A of the node A from the report packet A. Accordingly, the separation detecting unit 56b recognizes that the report packet A is sent from the node A. Furthermore, the separation detecting unit 56b sequentially extracts the identifier B of the node B and the identifier A of the node A, in this order, from the report packet B. Accordingly, the separation detecting unit 56b recognizes that the report packet B is sent starting from the node B via the node A. Furthermore, the separation detecting unit 56b sequentially extracts the identifier C of the node C and the identifier A of the node A, in this order, from the report packet C. Accordingly, the separation detecting unit 56b recognizes that the report packet C is sent starting from the node C via the node A. Consequently, the separation detecting unit 56b can recognize that the node A is located in one hop from the monitoring node 50 and recognize that the node B and the node C are located in one hop from the node A.

Thereafter, it is assumed that the separation detecting unit 56b receives, at this timing, the report packet A and the report packet B from the node A. Then, the separation detecting unit 56b extracts the identifier A of the node A from the report packet A. Accordingly, the separation detecting unit 56b recognizes that the report packet A is sent from the node A. Furthermore, the separation detecting unit 56b sequentially extracts the identifier B of the node B and the identifier A of the node A, in this order, from the report packet B. Thus, the separation detecting unit 56b recognizes that the report packet B is sent starting from the node B via the node A. Consequently, the separation detecting unit 56b can recognize that the node A is located in one hop from the monitoring node 50 and recognize that the node B is located in one hop from the node A.

Because the node C is not detected from the extraction result performed immediately previously and performed this time, the separation detecting unit 56b specifies the node C as a separation prediction node that is likely to separate. The reason that the separation detecting unit 56b detects the node C as a separation prediction node is that several reasons for the node C not sending a report packet can be conceivable. It is conceivable, as the reason for this, that the node has failed or a report packet can be received from the node C but the packet is discarded due to a small RSSI value. For another reason, it is conceivable that the node C is not able to receive a HELLO packet from a neighboring node because, for example, the node C is away from the other node or enters inside a building or it is conceivable that, even if the node C can receive a HELLO packet from a neighboring node, the RSSI value is small. In such a case, the node C is not able to send a HELLO packet because an entry is deleted from the link table 53 or the path table 54.

As described above, because several reasons can be conceived, the separation detecting unit 56b determines that the node C is likely to separate from the network. Furthermore, the separation detecting unit 56b can create the topology on the basis of the identifier of the node extracted from the report packet and on the basis of the order of the identifiers stored in the report packet. Consequently, the separation detecting unit 56b can perform warning by displaying, on the topology, an alarm at the position in which the node C immediately previously is connected. Furthermore, because the separation detecting unit 56b can specify that the node to which the node C immediately previously is connected is the node B, a warning message can be sent to the node C via the node B. Furthermore, the separation detecting unit 56b may also display the created topology on a displaying unit or the like. Alternatively, the separation detecting unit 56b may also send the created topology to a management server or the like connected in a network. Furthermore, the information that has been received and extracted by the separation detecting unit 56b may also be sent to a management server and then the management server may perform separation detection or topology creation.

The data sending processing unit 57 is a processing unit that performs a process of sending a HELLO packet or a report packet. The data sending processing unit 57 performs the same process as that performed by the data sending processing unit 17 described by referring to FIG. 2; therefore, a description thereof in detail will be omitted. Furthermore, similarly, the data sending processing unit 57 can also perform the process on the warning message described above.

Flow of Processes

In the following, the flow of a process performed by each of the nodes or the monitoring node will be described. Specifically, a description will be given of a report packet sending process, a report packet relaying process, and a separation node detecting process.

Report Packet Sending Process

Figure 8:
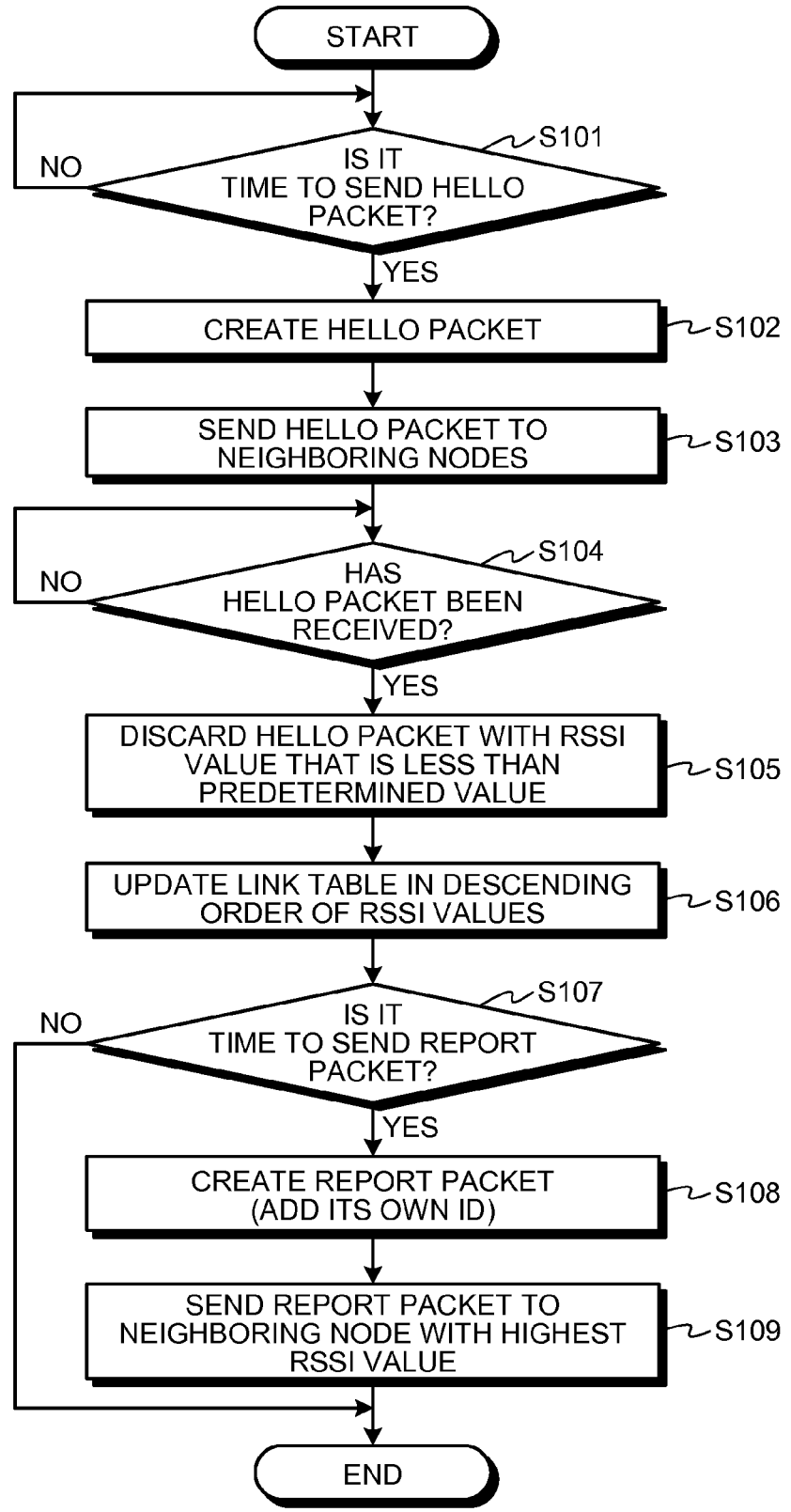
FIG. 8 is a flowchart illustrating the flow of a process performed between when a HELLO packet is received and when a report packet is sent.

FIG. 8 is a flowchart illustrating the flow of a process performed between when a HELLO packet is received and when a report packet is sent. In the following, a description will be given of the flow of the series of the processes performed between when a HELLO packet is received and when a report packet is sent; however, the processes are not limited thereto. For example, the processes may also be performed at different timing.

As illustrated in FIG. 8, if it is the time to send a HELLO packet (Yes at Step S101), the HELLO packet creating unit 16a in the node 10 creates a HELLO packet (Step S102). Then, the data sending processing unit 17 broadcasts the HELLO packet to the neighboring nodes (Step S103).

Then, when the packet filtering unit 12a receives the HELLO packets (Yes at Step S104), the packet filtering unit 12a discards, from among the received HELLO packets, the HELLO packet with the RSSI value that is less than the predetermined value (Step S105).

Subsequently, the HELLO processing unit 15a updates the link table 13 or the path table 14 on the basis of the HELLO packet and then the radio wave selecting unit 15b sorts the entries in the link table 13 in descending order of the RSSI values (Step S106).

Thereafter, if it is the time to send a report packet (Yes at Step S107), the report packet creating unit 16b creates a report packet that includes the node ID that is used to identify its own node (Step S108). Then, from among the LDs that are related to paths to the monitoring node 50 that is the destination in the link table 13, the report packet creating unit 16b sends a report packet toward the monitoring node 50 by using the LD with the highest RSSI value as the subsequent destination (Step S109). Specifically, the data sending processing unit 17 sends a report packet via the ad hoc protocol processing unit 12 and the wireless interface unit 11 in accordance with the instruction from the report packet creating unit 16b.

Report Packet Relaying Process

Figure 9:
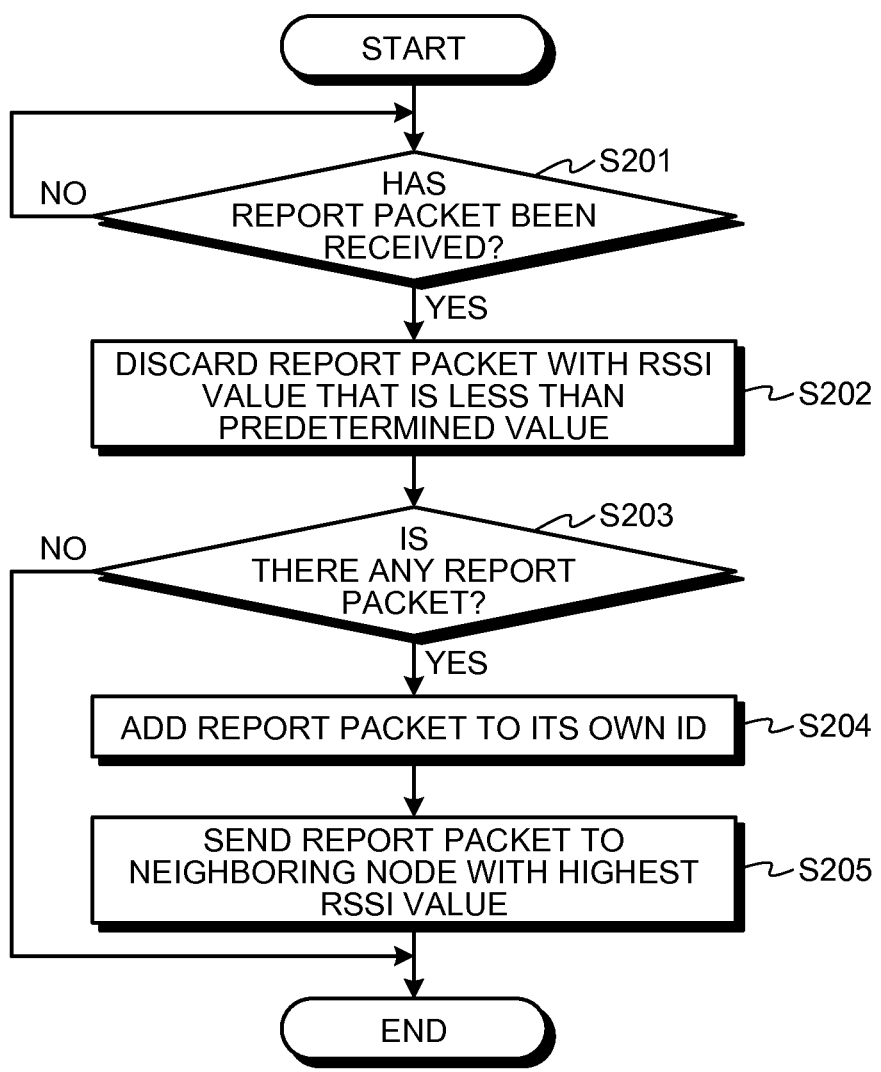
FIG. 9 is a flowchart illustrating the flow of a report packet relaying process.

FIG. 9 is a flowchart illustrating the flow of a report packet relaying process. As illustrated in FIG. 9, when the packet filtering unit 12a receives report packets from the other node (Yes at Step S201), the packet filtering unit 12a discards the report packet with the RSSI value that is less than the predetermined value at the time when the packet is received (Step S202).

Then, the report packet relaying unit 16c determines whether a report packet still remains after the filtering is performed (Step S203). Specifically, the report packet relaying unit 16c determines whether a report packet that is output from the packet filtering unit 12a and that is input via the data receiving processing unit 15 is present.

If the report packet relaying unit 16c determines that a report packet remains (Yes at Step S203), the report packet relaying unit 16c adds the node ID of its own node to the report packet (Step S204). At this point, the report packet relaying unit 16c adds the node ID in the order of the nodes such that the nodes through which the report packet goes can be specified.

Then, the report packet relaying unit 16c uses, from among the LDs that are related to paths to the monitoring node 50 that is the destination in the link table 13, the LD with the highest RSSI value as the subsequent destination and then sends the report packet to the monitoring node 50 (Step S205). Specifically, the data sending processing unit 17 sends a packet via the ad hoc protocol processing unit 12 and the wireless interface unit 11 in accordance with an instruction from the report packet creating unit 16b. Furthermore, if the report packet relaying unit 16c determines that no report packet remains (No Step S203), the report packet relaying unit 16c ends the process.

Separation Node Detecting Process

Figure 10:
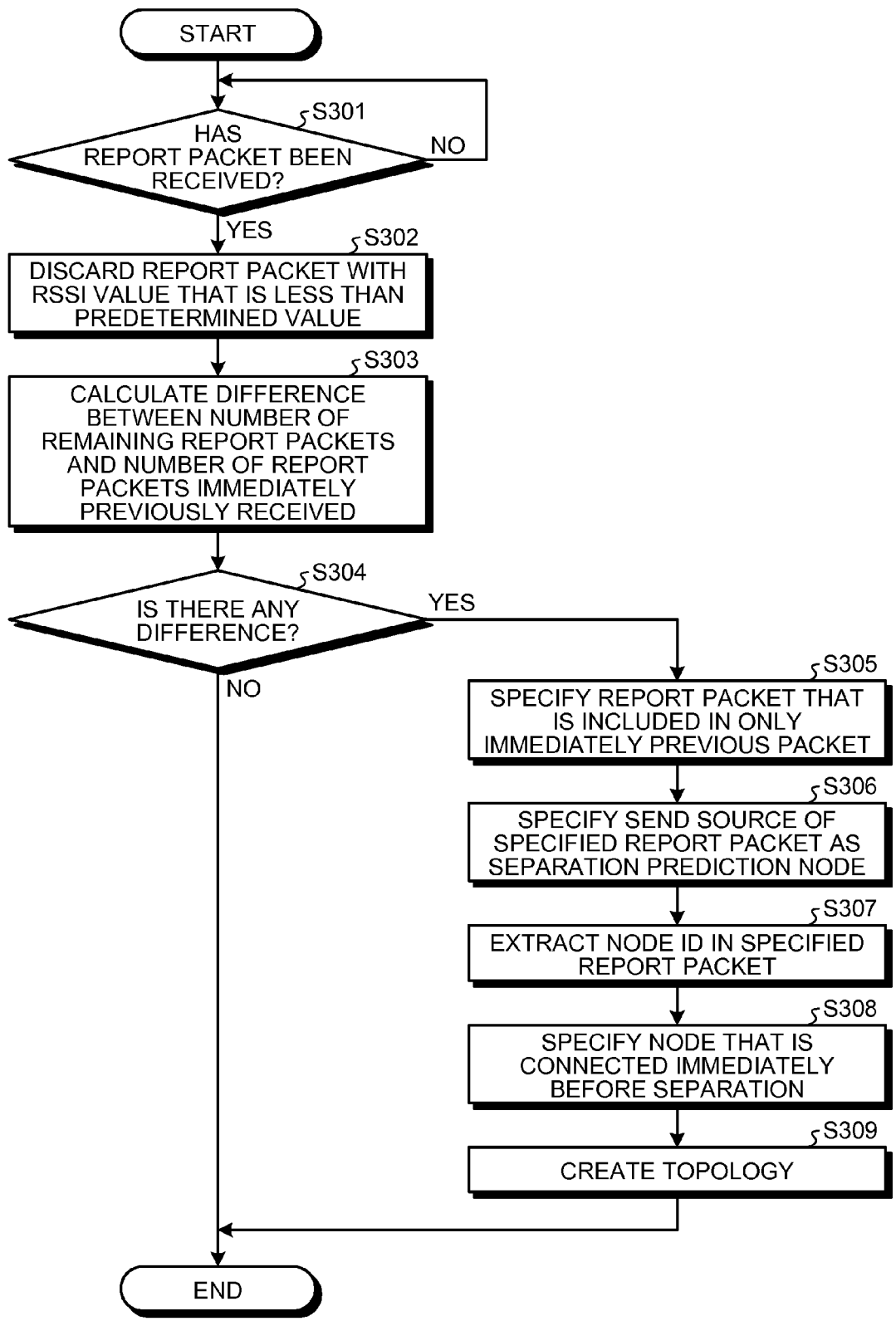
FIG. 10 is a flowchart illustrating the flow of a separation node detecting process.

FIG. 10 is a flowchart illustrating the flow of a separation node detecting process. As illustrated in FIG. 10, when the packet filtering unit 52a in the monitoring node 50 receives a report packet from each node 10 (Yes at Step S301), the packet filtering unit 52a discards the report packet with the RSSI value that is less than the predetermined value at the time when the packet is received (Step S302).

Subsequently, the separation detecting unit 56b calculates a difference between the number of remaining report packets after the filtering and the number of report packets that are immediately previously received (Step S303). It is assumed that the separation detecting unit 56b stores the report packet that was immediately previously received or the number of report packets in a memory or the like.

Then, if the separation detecting unit 56b determines that there is no difference between the number of remaining report packets after the filtering and the number of report packets that are immediately previously received (No at Step S304), the separation detecting unit 56b ends the process. Specifically, if the separation detecting unit 56b can receive the report packets the number of which is the same as that immediately previously received, the separation detecting unit 56b determines that no node that is likely to separate is present.

In contrast, if the separation detecting unit 56b determines that there is a difference between the number of remaining report packets after the filtering and the number of report packets that are immediately previously received (Yes at Step S304), the separation detecting unit 56b performs the process at Step S305. In this example, it is assumed that the number of report packets that are immediately previously received is greater than the number of report packets that are received this time. In such a case, the separation detecting unit 56b specifies a report packet that is included in only the immediately previous packets (Step S305). Furthermore, if the number of report packets that are received this time is greater than that immediately previously received, the separation detecting unit 56b detects that a new node has joined in the ad hoc network.

Then, the separation detecting unit 56b specifies the send source node of the specified report packet, i.e., a creation source node of the report packet, that is only included in the immediately previous packets, and then determines that the specified node is the separation prediction node (Step S306).

Furthermore, from the specified report packet that is only included in immediately previous packets, the separation detecting unit 56b sequentially extracts the node IDs in the order they are added (Step S307). Then, by combining the extracted node IDs, the separation detecting unit 56b specifies the send source node, i.e., the node to which a separation prediction node is connected immediately before the separation (Step S308).

Then, the separation detecting unit 56b extracts the node ID from each of the report packets that are received this time and combines the extracted node IDs, whereby the separation detecting unit 56b creates a topology of the ad hoc network (Step S309). Furthermore, the separation detecting unit 56b may also use the report packets that are immediately previously received. Furthermore, the separation detecting unit 56b may also display an alarm on the topology such that a separation prediction node can be identified.

Specific Example

Figure 11:
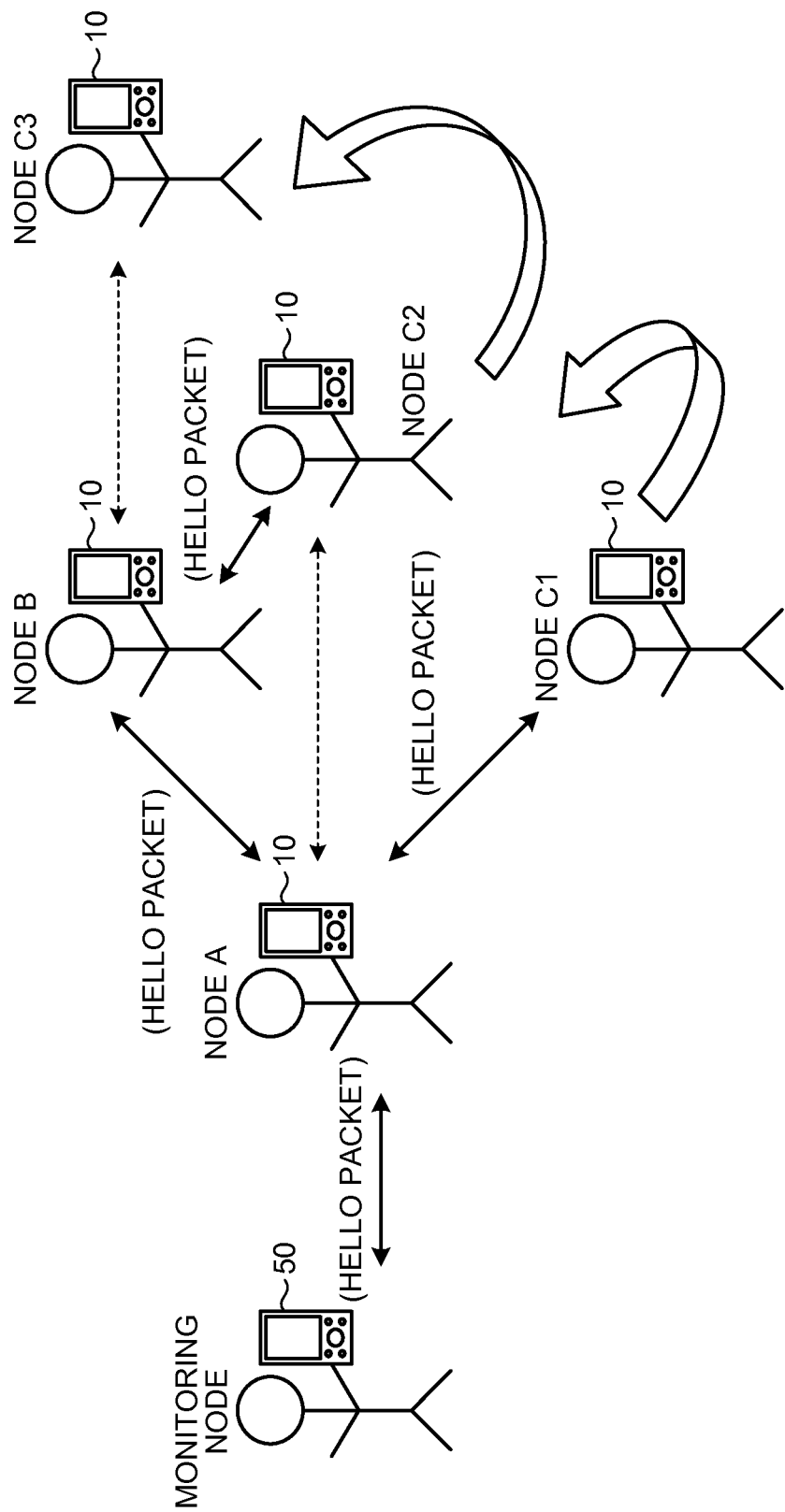
FIG. 11 is a schematic diagram illustrating a specific example of the occurrence of a separation node.

In the following, a description will be given of a specific example in which a separation node occurs. FIG. 11 is a schematic diagram illustrating a specific example of the occurrence of a separation node. As illustrated in FIG. 11, it is assumed that the configuration of the ad hoc network is the same as that illustrated in FIG. 1. In this example, a description will be given of a case in which the node C moves from a node C1 that is the neighboring node of the node A to the node C2 that is the neighboring node of the node B, then finally moves to the location of the node C3, and separates from the network.

If the node C is located at the location of a node C1, because the RSSI value of the HELLO packet received from the node A is the greatest, the node C sends a report packet to the monitoring node 50 via the node A.

Thereafter, when the node C moves to the location of a node C2 and thus is closer to the node B, the RSSI value of the HELLO packet received from the node A becomes small in the node C, whereas the RSSI value of the HELLO packet received from the node B becomes large. Then, because the RSSI value of the HELLO packet received from the node B is the largest, the node C switches the paths to the path via the node B and sends the report packet to the monitoring node 50. At this point, in order to reduce the variation, a constant hysteresis may also be used.

Furthermore, when the node C moves to the location of a node C3, the RSSI value of the HELLO packet received from the node B becomes small in the node C. Then, the RSSI value of the HELLO packet received from the node B is less than the predetermined value in the node C and thus the node C deletes the node B from the link table 13 or the like. Consequently, the node C stop sending the report packet and thus the monitoring node 50 is not able to receive the report packet from the node C.

Accordingly, the monitoring node 50 receives, via the node B and the node A, the report packet sent from the node C until immediately previous time; however, the monitoring node 50 is not able to receive the report packet this time. Because of this, the monitoring node 50 calculates a difference between the number of report packets obtained immediately previous time and the number of report packets obtained this time, detects that the monitoring node 50 is not able to receive the report packet from the node C, and specifies the node C as a separation prediction node. At this point, the monitoring node 50 can specify that the node to which the node C immediately previously connects is the node B and can also detect that the node C has separated from the network at the location in the vicinity of the node B.

Figure 12:
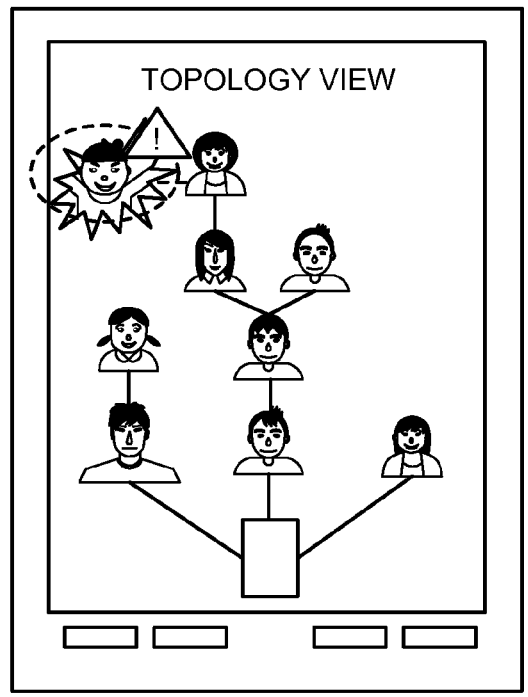
FIG. 12 is a schematic diagram illustrating an example of the topology.
Figure 13:
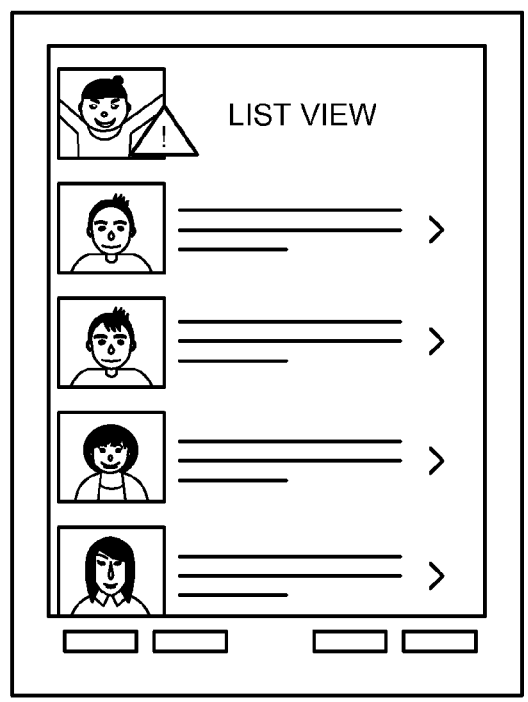
FIG. 13 is a schematic diagram illustrating an example of a list.

Furthermore, the monitoring node 50 can also notify an administrator of a separation prediction node by using a topology or a list. FIG. 12 is a schematic diagram illustrating an example of the topology. FIG. 13 is a schematic diagram illustrating an example of a list. As illustrated in FIG. 12, the monitoring node 50 can create a topology from the node ID included in each of the received report packets and the order of the node IDs. At this point, the monitoring node 50 can also display an alarm such that a separation prediction node can be identified. Furthermore, as illustrated in FIG. 13, the monitoring node 50 stores therein a list for managing, for example, a telephone number or an email address of each node and displays an alarm on the list such that a separation prediction node is identified. In this way, because the monitoring node 50 can output a separation prediction node as an alarm by using various methods, an administrator can promptly detect the separation prediction node.

Advantage

As in a children observation system, even if a node frequently moves, each node can be monitored without using a special method, such as a GPS. For example, when kindergartners go to and from a kindergarten in a group or take a walk in a group, a teacher who leads the kindergartners can easily specify an object that has separated from a group behavior in a group, in particular, in a moving group, or an object that is likely to separate from the group and can easily be aware of a person from whom the object is likely to separate. Consequently, it is possible to reduce the load applied to the leader.

Furthermore, because it is possible to detect a node that is likely to separate from an ad hoc network, i.e., a node that has a small RSSI value but that can receive a packet, it is possible to take an action, such as sending an alarm to the target node before the node actually separates from the network. Consequently, separation can be previously prevented. Furthermore, because it is possible to specify the node to which a separation prediction node is immediately previously connected, a search instruction can be sent to that node indicating the searching for the separation prediction node, it is possible to implement early detection of a separation prediction node.

Second Embodiment

In the following, an example of sending a report packet by using a method different from the first embodiment will be described. Specifically, an example in which each node sends a report packet to which path information that is retained by each node is added and an example in which each node diverts a report packet from another node will be described.

Sending Path Information

Figure 14:
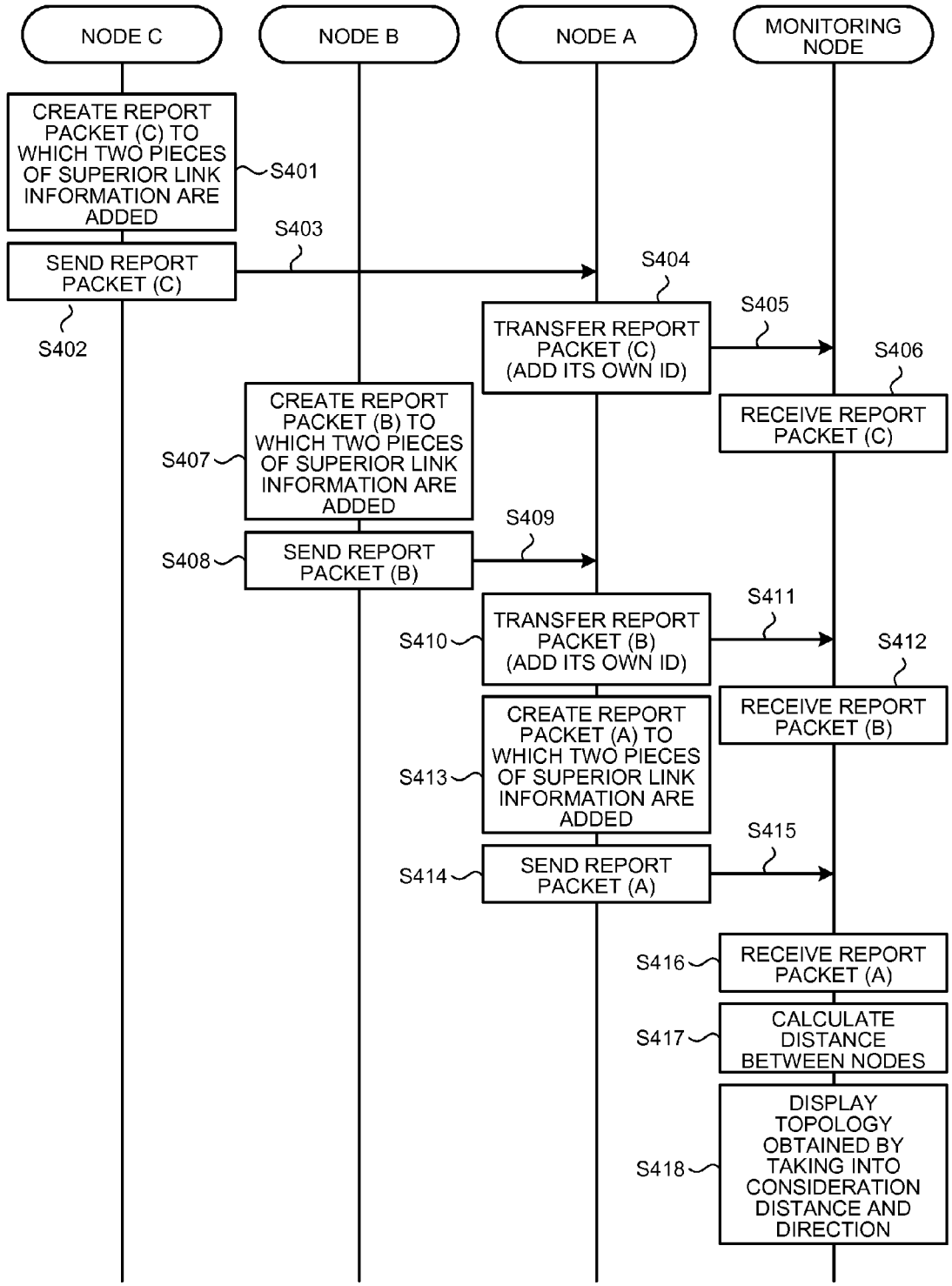
FIG. 14 is a sequence diagram illustrating the flow of a process that adds path information to a report packet and sends the packet.

In the following, a description will be given of an example in which each node adds two pieces of path information that has a higher RSSI value and sends a report packet. FIG. 14 is a sequence diagram illustrating the flow of a process that adds path information to a report packet and sends the packet.

As illustrated in FIG. 14, the node C creates, from the link table 13, a report packet (C) to which two pieces of superior link information are added (Step S401) and sends the report packet (C) to the node A that has the highest RSSI value at the time when a HELLO packet is received (Steps S402 and S403). In the second embodiment, a description will be given of an example of adding two pieces of superior link information; however, the number of additions can be arbitrarily set.

The node A adds the node ID of its own node to the report packet (C) received from the node C and then transfers the report packet (C) to the monitoring node 50 (Step S404 and S405). Then, the monitoring node 50 receives, via the node A, the report packet (C) sent from the node C (Step S406).

Furthermore, the node B creates, from the link table 13, a report packet (B) to which two pieces of superior link information are added (Step S407) and sends the report packet (B) to the node A that has the highest RSSI value at the time when a HELLO packet is received (Steps S408 and S409).

The node A adds the node ID of its own node to the report packet (B) received from the node B and transfers the report packet (B) to the monitoring node 50 (Step S410 and S411). Then, the monitoring node 50 receives, via the node A, the report packet (B) sent from the node B (Step S412).

Furthermore, the node A creates, from the link table 13, a report packet (A) to which two pieces of superior link information are added (Step S413) and sends the report packet (A) to the monitoring node 50 (Steps S414 and S415). Then, the monitoring node 50 receives the report packet (A) sent from the node A (Step S416).

Then, the separation detecting unit 56b in the monitoring node 50 calculates the distance between the nodes (Step S417), creates a topology in which the distance and the direction are taken into consideration, and displays the topology (Step S418). For example, the separation detecting unit 56b can estimate the distance from the RSSI values and can specify the positional relationship between the nodes on the basis of information indicating which packet has passed through which node. Furthermore, each of the multiple nodes acquires an RSSI value between one of the other nodes and can estimate the location of a node on the basis of the acquired data. For example, if the node A retains the distance between the node B and the node C and if the node B retains the distance between the node A and the node C, it is possible to estimate that the location of the node C is the intersection of a circle of the distance between the node A and the node C and a circle of the distance between the node B and the node C. In such a case, the similar positional relationships between multiple nodes are acquired and the least squares method may also be used in order to calculate the location of a node on the basis of the acquired positional relationships.

For example, it is assumed that the RSSI value at the time of reception of a report packet whose send source is the node C is 40. Furthermore, it is assumed that the RSSI value at the time of reception of a HELLO packet sent from the node A included in the report packet is 80 and the RSSI value at the time of reception of a HELLO packet sent from the node B included in the report packet is 20. In such a case, the separation detecting unit 56b calculates the relative positional relationship between the monitoring node 50 and the node C by using the least squares method using the RSSI value of 40 and the RSSI value of 80. Similarly, the separation detecting unit 56b calculates the relative position between the monitoring node 50 and the node C by using the least squares method using the RSSI value of 40 and the RSSI value of 20. Then, the separation detecting unit 56*b* specifies the direction of the node C from the calculated both relative position.

By doing so, it is possible to easily be aware of the relative position from a monitoring node that monitors a kindergartner who is likely to separate from a group and thus the monitoring can be performed with high accuracy. Furthermore, because it is possible to create a topology taking into consideration the relative position or the direction, an observer or a leader can easily identify the location of a node and thus easily help a separation node.

Relay a Report Packet

Figure 15:
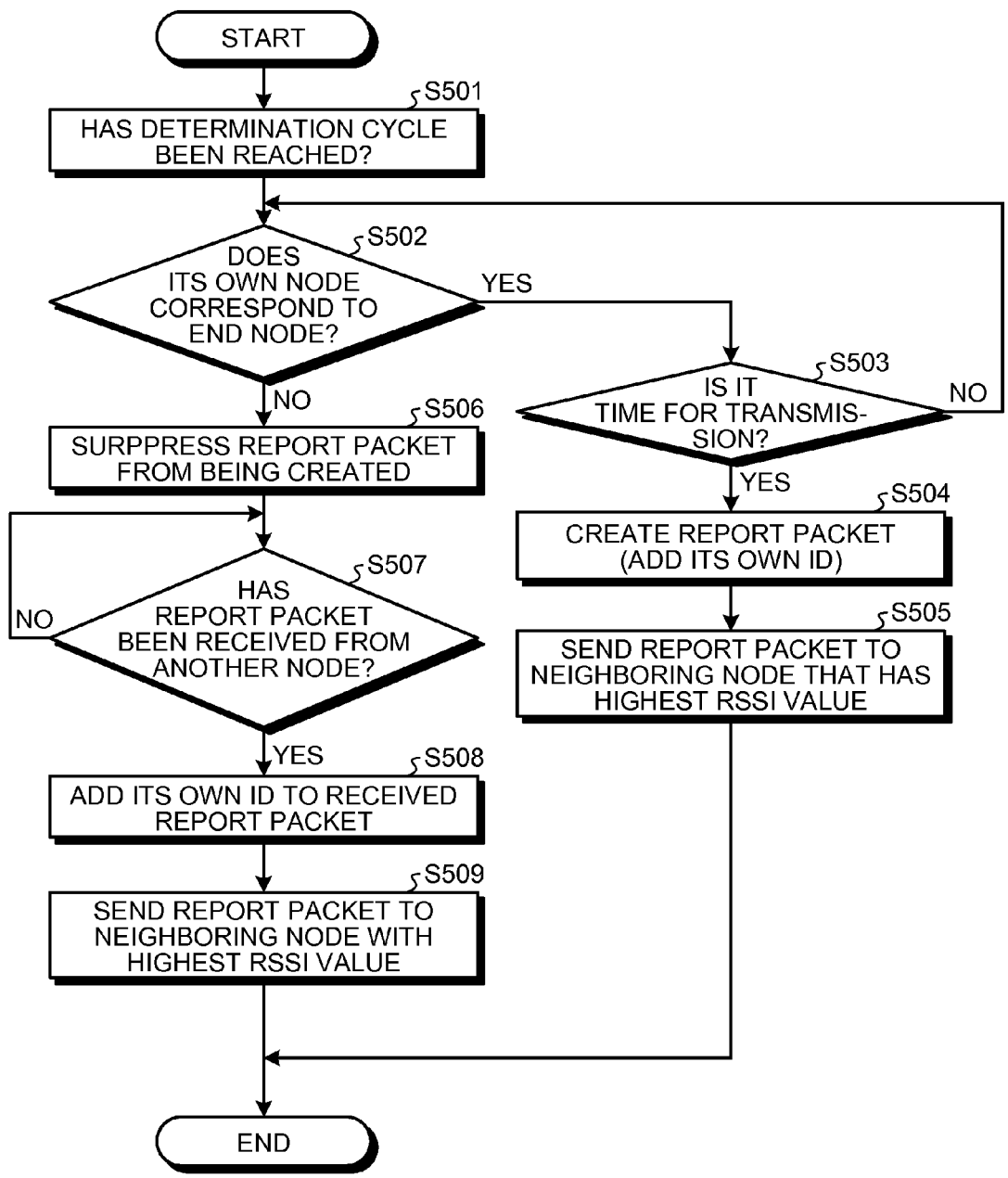
FIG. 15 is a flowchart illustrating the flow of a process of reducing the number of packets by diverting a report packet.

FIG. 15 is a flowchart illustrating the flow of a process of reducing the number of packets by diverting a report packet. As illustrated in FIG. 15, when it is time to determine the role of its own node (Step S501), the report packet creating unit 16*b* in the node 10 determines whether its own node is the end point (Step S502). For example, the report packet creating unit 16*b* determines whether its own node is the end node in an ad hoc network on the basis of whether a report packet is relayed before now.

If the report packet creating unit 16*b* determines that its own node is the end point (Yes at Step S502), the report packet creating unit 16*b* determines whether a report packet is to be sent (Step S503). If it is the time to send a report packet (Yes at Step S503), the report packet creating unit 16*b* creates a report packet in which the node ID that identifies its own node is included (Step S504). Then, the report packet creating unit 16*b* sends the report packet toward the monitoring node 50 by using, as the subsequent destination, an LD with the highest RSSI value from among the LDs related to a path in which the monitoring node 50 is the destination in the link table 13 (Step S505). If it is the time to send a report packet (No at Step S503), the report packet creating unit 16*b* returns to Step S502 and repeats the process at Step S502 and the subsequent processes.

In contrast, if the report packet creating unit 16*b* determines that its own node is not the end point but is a relay node (No at Step S502), the report packet creating unit 16*b* stops creating the report packet (Step S506).

Thereafter, when the report packet relaying unit 16*c* receives a report packet with a high RSSI value from another node (Yes at Step S507), the report packet relaying unit 16*c* adds the node ID of its own node to the received report packet (Step S508). At this point, the report packet relaying unit 16*c* adds the node ID in the order the report packet is received such that the nodes through which the report packet goes can be identified.

Then, the report packet relaying unit 16*c* sends the report packet toward the monitoring node 50 by using, as the subsequent destination, the LD with the highest RSSI value in the link table 13 from among the LDs related to the path in which the monitoring node 50 is the destination (Step S509).

As described above, the report packet received from the other node can be diverted as the report packet of its own node. Consequently, it is possible to reduce the number of report packets reported toward the monitoring node in an ad hoc network. Furthermore, in accordance with the reduction in the number of packets, the occurrence of congestion can be suppressed and also can be suppressed even if the number of objects to be monitored is large.

Third Embodiment

The embodiments of the present invention have been described; however, the present invention is not limited to the embodiments described above and can be implemented with various kinds of embodiments other than the embodiment described above. Therefore, another embodiment included in the present invention will be described below as a second embodiment.

Creating Path Information

In the second embodiment, a description has been given of an example in which a predetermined pieces of information is acquired from the link table 13 that is created from a HELLO packet with RSSI value that is equal to or greater than a predetermined value and then the acquired information is added to a report packet; however, the present invention is not limited thereto. For example, in such a case, an entry to be stored in the link table 13 may also be created from a HELLO packet with an RSSI value that is less than the predetermined value and path information that is added to the report packet may also be specified by taking into consideration the entry.

Applies to a Service

In the first embodiment described above, a description has been given of an example of children going to and from school; however, the present invention is not limited thereto. For example, the embodiment can be used to support a team of mountain climbers such that a certain distance can be maintained between the head and the rear end of the team. Furthermore, in a case of grazing livestock or moving livestock fed by nomad in a group, the relative position of a specific object can be promptly identified and thus it is possible to speed up the collection of health management information on the livestock or speed up a prevention action based on the collection.

System

Of the processes described in the embodiments, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings can be arbitrarily changed unless otherwise stated.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

Hardware Configuration

Figure 16:
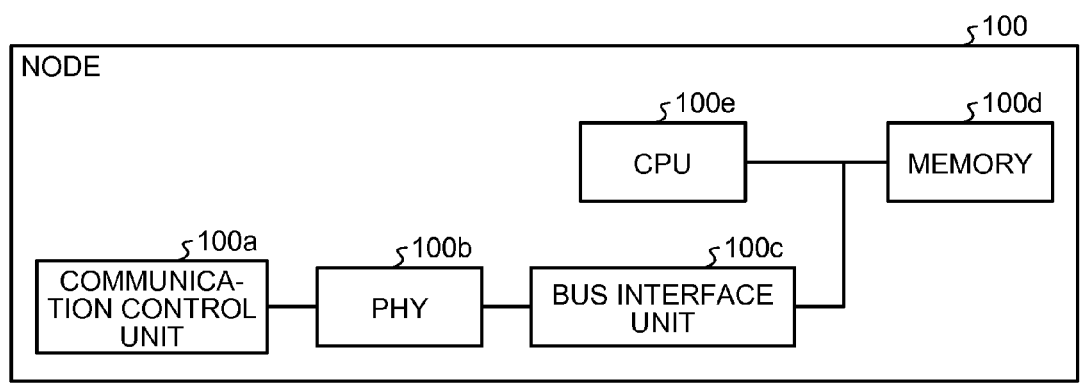
FIG. 16 is a block diagram illustrating an example of the hardware configuration of a node.

FIG. 16 is a block diagram illustrating an example of the hardware configuration of a node. Because the nodes and the monitoring node have the same configuration, a description will be given of a node 100. As illustrated in FIG. 16, the node 100 includes a communication control unit 100*a*, a physical layer (PHY) 100*b*, a bus interface unit 100*c*, a memory 100*d*, and a central processing unit (CPU) 100*e*.

The communication control unit 100*a* is a processing unit that performs communication with another node and is, for example, an antenna or a network interface card. The PHY 100*b* is a physical layer hardware unit. In the PHY 100*b*, an operation related to network connection or data transmission in the physical layer is stipulated. The PHY 100*b* implements communication with a counterpart device via the communication control unit 100*a*. Furthermore, the PHY 100*b* may also be implemented by software.

The bus interface unit 100*c* is a bus interface that is used to exchange a signal among a CPU 10*e*, the memory 100*d*, the PHY 100*b*, and the like. The memory 100*d* includes, for example, a read only member (ROM), a random access memory (RAM), or the like and is a storage device that stores therein a program that implements various processes used in the communication method according to the embodiment; a path table and the link table, which have been described above; and data that is obtained in the course of a process.

The CPU 100*e* is a processing unit that manages various processes performed by the node 100 and executes the various processes in the communication control method according to the embodiment. For example, the CPU 100*e* executes each of the processing units illustrated in FIG. 2 or each of the processing units illustrated in FIG. 5. Furthermore, the CPU 100*e* reads and executes the program having the same function as that performed by each of the processing units illustrated in FIG. 2 or FIG. 5 from the memory 100*d* or the like so that the CPU 100*e* can execute the same function as that performed by each of the processing units illustrated in FIG. 2 or FIG. 5.

According to an aspect of an embodiment of the wireless communication method, the node, and the monitoring node disclosed in the present invention, an advantage is provided in that a separation location of a node can be specified.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication method used in a wireless system including a plurality of first nodes, a plurality of second nodes and a third node which execute a wireless communication using a wireless ad hoc network, the wireless communication method comprising:

selecting a selection node that is a send source of a packet with the highest received radio wave intensity from among packets which are transmitted by the plurality of second nodes, by the plurality of first nodes;

sending, to the selection node, a report packet that includes an identifier that specifies each of the plurality of first nodes and whose destination is the third node, by the plurality of first nodes;

adding an identifier that specifies each of the plurality of second nodes to the report packet which is received with the received radio wave intensity that is equal to or greater than a predetermined value among the report packets which are transmitted by the plurality of first nodes and relaying the report packet to the third node, by the plurality of second nodes; and detecting a node corresponding to the identifier that is not included in the report packets received from the plurality of second nodes, by the third node.

2. The wireless communication method according to claim 1, wherein the sending includes sending, when the report packet is sent to the third node, the report packet after adding, to the report packet, a combination of the received radio wave intensity and the identifier of the second node with a received radio wave intensity that is equal to or greater than a predetermined value at the time when the packet is received, and the detecting includes calculating the positional relationship or the distance between the nodes by using the identifier of each of the nodes and the received radio wave intensity that are included in the received report packet and by using the received radio wave intensity at the time when the report packet is received.

3. The wireless communication method according to claim 1, wherein the sending includes suppressing the report packet from being created when the each of the plurality of first nodes is a relay node that relays the report packet to another node in the ad hoc network.

4. A node comprising:

a selecting unit that selects, from among packets received from neighboring nodes, a neighboring node that is a send source of a packet with the highest received radio wave intensity;

a sending unit that sends, to the neighboring node selected by the selecting unit, a report packet that includes an identifier for specifying the node and whose destination is a monitoring node; and a relaying unit that adds an identifier of the node to the report packet that is received from the neighboring node with the received radio wave intensity that is equal to or greater than a predetermined value and that relays the report packet to the monitoring node.

5. A monitoring node comprising:

a receiving unit that receives a report packet that is sent from each node and to which an identifier for identifying a send source node of the report packet and an identifier of a node that relays the report packet are added in an order the report packet is relayed; and a detecting unit that detects a node that is not included in the report packets received, from the nodes, by the receiving unit.

* * * * *